May 30, 1933.　　　O. U. ZERK　　　1,912,240
LUBRICATING APPARATUS
Filed May 19, 1930　　　6 Sheets-Sheet 1

Inventor
Oscar U. Zerk
By Williams Bradbury McCaleb & Hinkle
Attys.

May 30, 1933.  O. U. ZERK  1,912,240
LUBRICATING APPARATUS
Filed May 19, 1930   6 Sheets-Sheet 3

Inventor
Oscar U. Zerk
By Williams Bradbury McCaleb & Hinkle
Attys.

May 30, 1933.  O. U. ZERK  1,912,240

LUBRICATING APPARATUS

Filed May 19, 1930  6 Sheets-Sheet 4

Inventor
Oscar U. Zerk
By Williams Bradbury McCaleb & Hinkle
Attys

May 30, 1933.  O. U. ZERK  1,912,240
LUBRICATING APPARATUS
Filed May 19, 1930   6 Sheets-Sheet 5
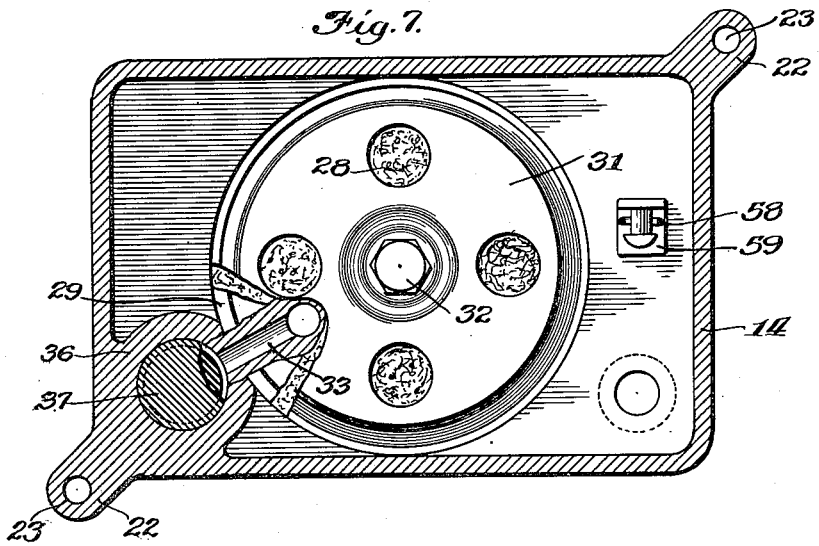
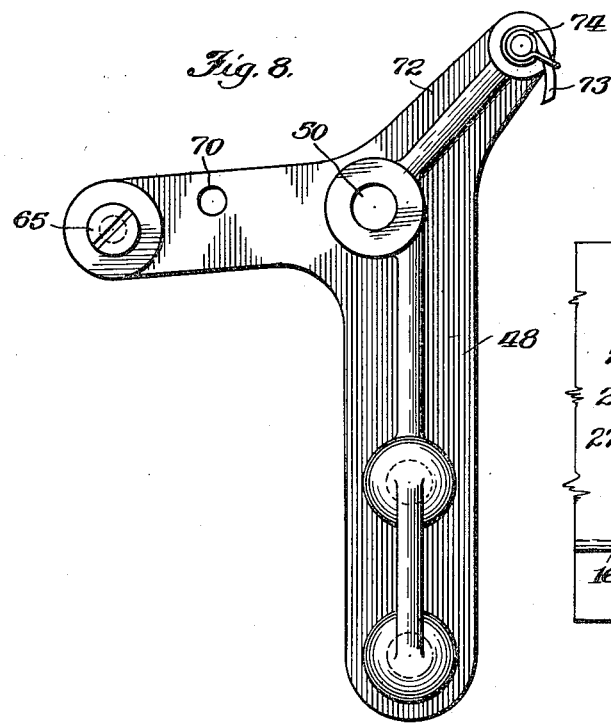
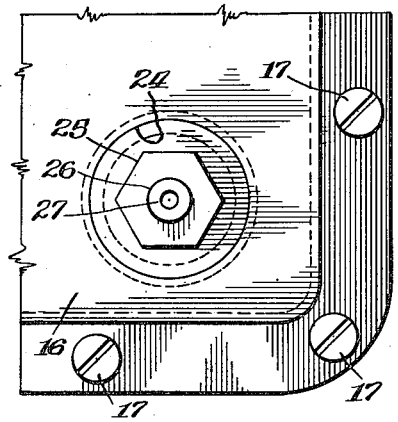
Inventor
Oscar U. Zerk
By Williams Bradbury McCaleb & Hinkle
Attys.

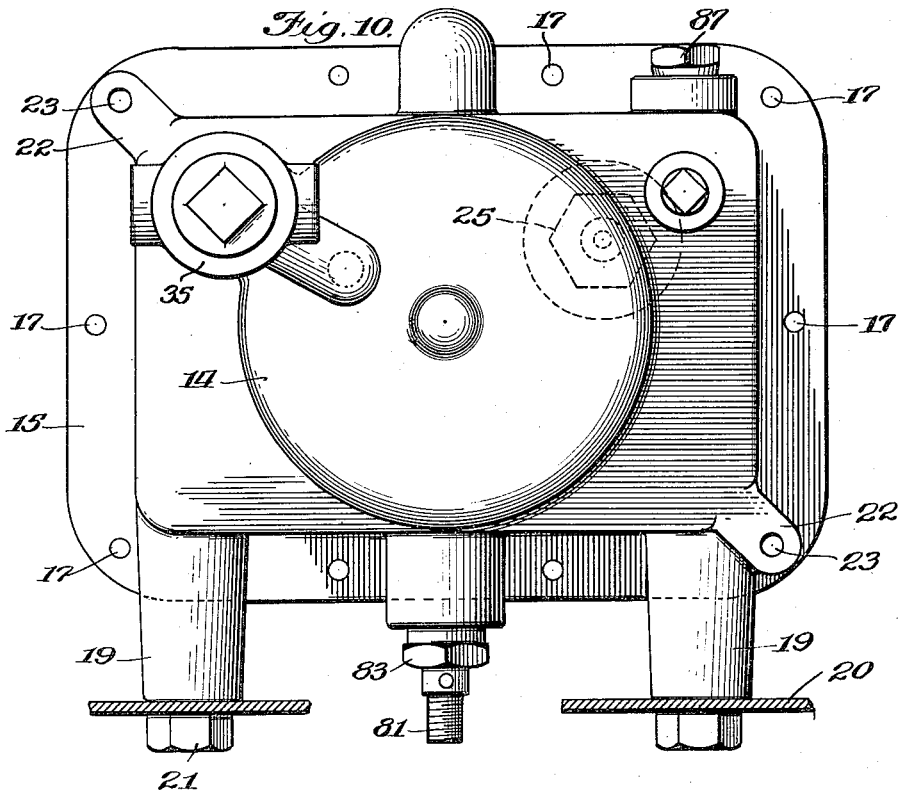
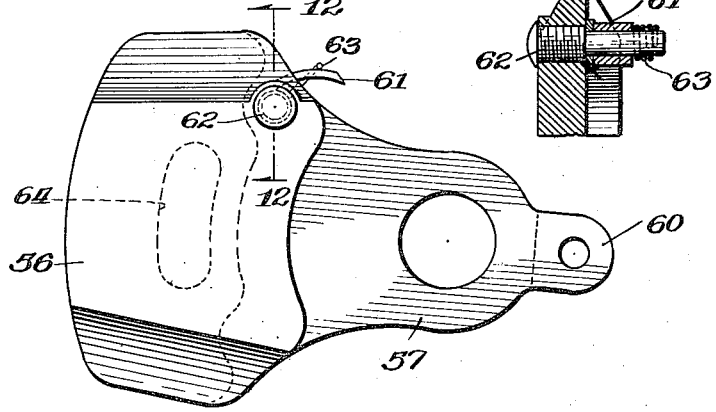

Patented May 30, 1933

1,912,240

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed May 19, 1930. Serial No. 453,497.

My invention relates to lubricating apparatus and more particularly to so-called centralized lubricating systems especially adapted for, but not necessarily limited to the lubrication of the bearings of automotive vehicles. Centralized lubricating systems comprise, in general, a source of lubricant supply, a lubricant pump communicating therewith and fed therefrom, a branched conduit system connecting the lubricant pump with a plurality of bearings requiring lubrication, and metering devices in the various branches of the conduit system for properly apportioning the lubricant supplied by the pump among the various bearings. My present invention is particularly concerned with a combined lubricant reservoir and pump peculiarly adapted for use as part of such a centralized lubricating system.

An object of my invention is to provide a new and improved combined lubricant reservoir and pump particularly adapted for use as part of a centralized lubricating system.

Another object is to provide a new and improved inertia operated pump.

Another object is to provide novel means for regulating the frequency of operation of such a pump.

Another object is to provide novel means for mounting such a pump in a lubricant reservoir.

Another object is to provide novel filter means interposed between the lubricant reservoir and pump.

Another object is to provide a combined lubricant reservoir and pump which is compact, durable and reliable in operation, and which may be manufactured economically.

Other objects and advantages will become apparent as the description proceeds.

In the drawings:

Figure 7 is a section on the line 7—7 of Figure 2;

Figure 8 is a view of a detail;

Figure 9 is a partial plan view showing that portion of the top having the filling opening and cap therefor;

Figure 10 is a bottom view of Figure 1;

Figure 11 is a view of the inertia weight and parts carried thereby; and

Figure 12 is a section on the line 12—12 of Figure 11.

Figure 1:
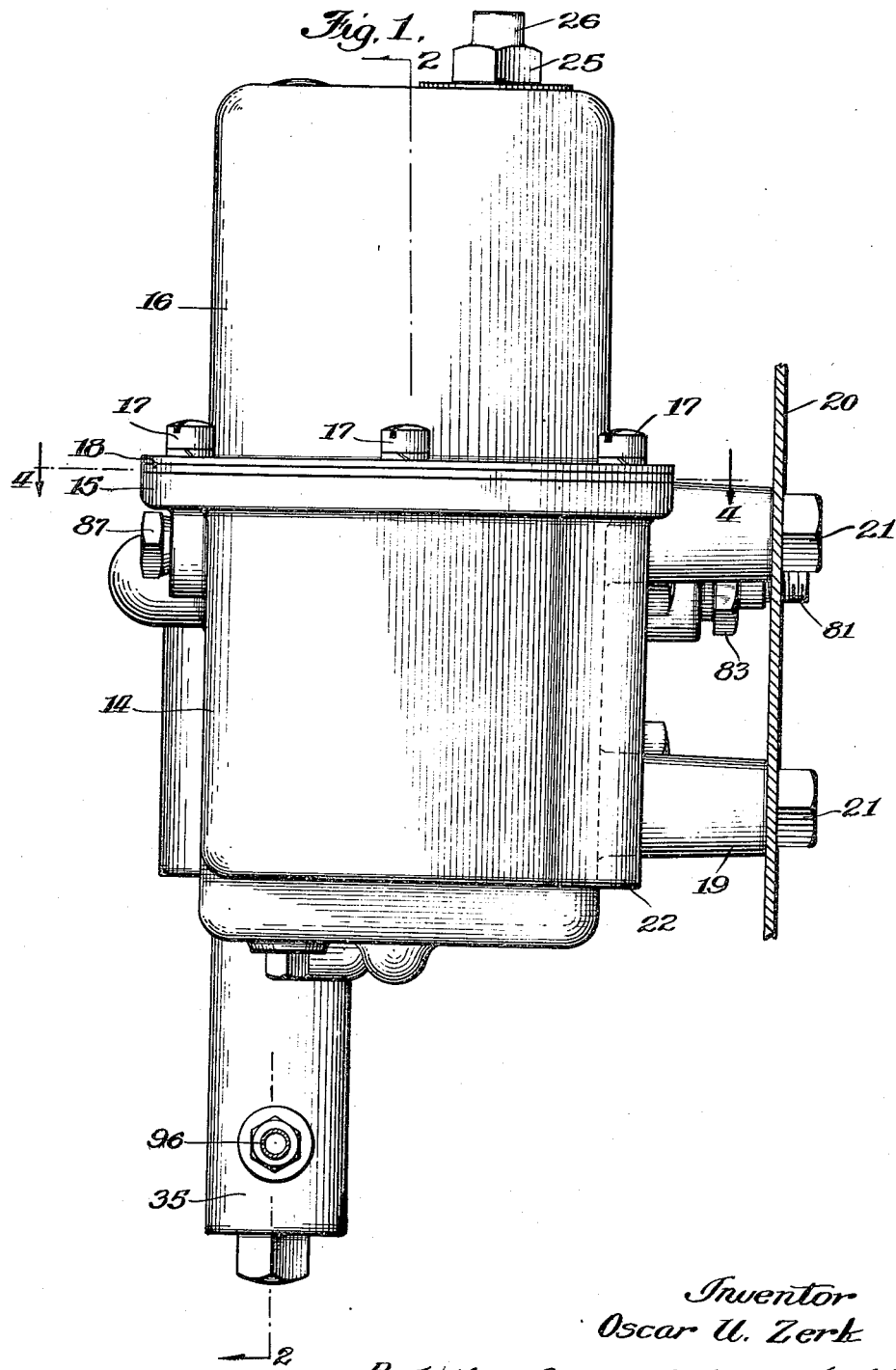
Figure 1 is an elevation of my combined lubricant reservoir and pump showing it attached to a suitable supporting member.

Referring to the drawings, I have illustrated my combined reservoir and pump as including a casting 14 having a laterally extending flange 15 at its upper end to which is secured a cover 16 by means of screws 17 or other suitable fastening means. A washer 18 of leather, cork, fiber, or other suitable material, is interposed between the top 16 and the flange 15 to insure a lubricant-tight joint. The casting 14 is provided with bosses 19 secured to a suitable supporting member 20 such, for example, as the dash of an automobile, by means of bolts 21. The casting 14 is also provided with vertical ribs 22 provided with threaded bores 23 adapted to receive bolts or similar fastening means to attach the casting 14 to suitable supporting means located beneath the casting when the latter type of supporting means is more convenient. The casting 14 and top 16 together form a reservoir for holding lubricant which may be poured into the reservoir through an opening 24 provided in the top 16 and normally closed by a suitable plug 25. The plug 25 has a cylindrical centrally located portion 26 extending well above the top of the reservoir and provided with a vent opening 27 for maintaining the interior of the reservoir under atmospheric pressure. The location of the small vent opening 27 in the raised portion 26 of the plug 25 makes it practically impossible for any lubricant to splash out of this vent opening when the machine is traveling over a rough road.

In the bottom of the casting 14 I preferably provide a filter 28 composed of felt or other suitable material and supported by annular shoulders 29 and 30 formed in the casting and protected and held in place by a perforated metal stamping 31 secured in place by a bolt 32 threaded into a thickened section of the bottom wall of the casting 14. The lubricant passing thru the strainer 28 thence flows through a passageway 33 into a bore 34 having a lower end 35 constituting a pump cylinder and an upper end 36 constituting a guide for the plunger rod 37 of the plunger 38 located in the cylinder 35.

The plunger proper consists of the lower end of the plunger rod 37, a cup leather 39 and a retaining member 40 threaded into the lower end of the plunger rod and serving to hold the cup leather in place. As clearly shown in Figure 2, the retaining member 40 displaces almost the entire contents of the cylinder 35, while at the same time maintaining the cup leather 39 well above the outlets 41 even when the plunger is at the lowest point in its stroke. This construction lengthens the life of the cup leather by eliminating the wear which would result were the cup leather to slide back and forth across the outlets 41, and also prevents the retention of a large body of air or air and lubricant in the cylinder which might tend to interfere with the inflow of additional lubricant on the up stroke of the plunger.

That portion of the plunger rod 37 which is opposite the passageway 33 is of reduced diameter to provide an annular chamber 42 which receives the lubricant supplied through the passageway 33. The end 43 of the plunger rod 37 is also slightly smaller than the bore 34 and permits lubricant to pass from the annular chamber 42 to the rear of the cup leather 39 which collapses during the up stroke of the plunger, thereby permitting lubricant to flow from the chamber 42 into the cylinder 35. On the down stroke of the plunger the cup leather expands against the cylinder wall and forms an effective seal therewith.

The upper end 44 of the plunger rod 37 is of reduced diameter and forms a guide for the lower end of a spring 45 which operates the plunger on its downward stroke. The lower end of this spring rests against a metal washer 46 resting on the shoulder formed by the junction of the reduced end 44 with the main body part of the plunger rod 37. The upper end of the spring 45 rests against the cover 16 and is maintained in proper alignment with the plunger by a guide member 47 riveted or otherwise suitably secured to the cover 16. I will now describe my novel means for raising the plunger against the tension of this spring.

As shown most clearly in Figures 2, 3, 4, 6 and 8, I provide a Y-shaped frame 48 which I preferably attach to the casting 14 by means of bolts 49. This frame is provided with a threaded opening 50 carrying a pin 51 on which is rotatably mounted a sleeve 52 retained on the pin 51 by a suitable cross pin 53. A ratchet wheel 54 and pinion 55 are mounted on the sleeve 52 and rotate therewith. An inertia weight 56 is integral with a lever 57 pivoted on the sleeve 52 and is approximately balanced by a spring 58 having one end attached to a spring support 59 secured in the casting 14, and the other end attached to the end 60 of the lever 57. A pawl 61 is pivotally mounted on a pin 62 secured to the upper end of the inertia weight and is urged into engagement with the ratchet wheel 54 by a spring 63. The inertia weight 56 is provided with a slot 64 into which projects the head of a screw 65 mounted in the arm 66 of the Y-shaped frame 48. The slot 64 and screw 65 determine the range of oscillation of the weight 56 and lever 57 about the sleeve 52. Since the range of oscillation of the inertia weight is thus unadjustable, I provide special means to permit variation of the effect of the oscillation of the weight 56 on the ratchet wheel 54 in order to accommodate the device to different conditions of operation. This means takes the form of a guard plate 67 pivoted on the pin 51 and retained in selected position by a nut and bolt 68 passing through a slot 69 in the guard plate and an opening 70 in the frame 48. A suitable sleeve 71, interposed between the guard plate 67 and the frame 48, maintains the proper spacing of these elements.

Figure 2:
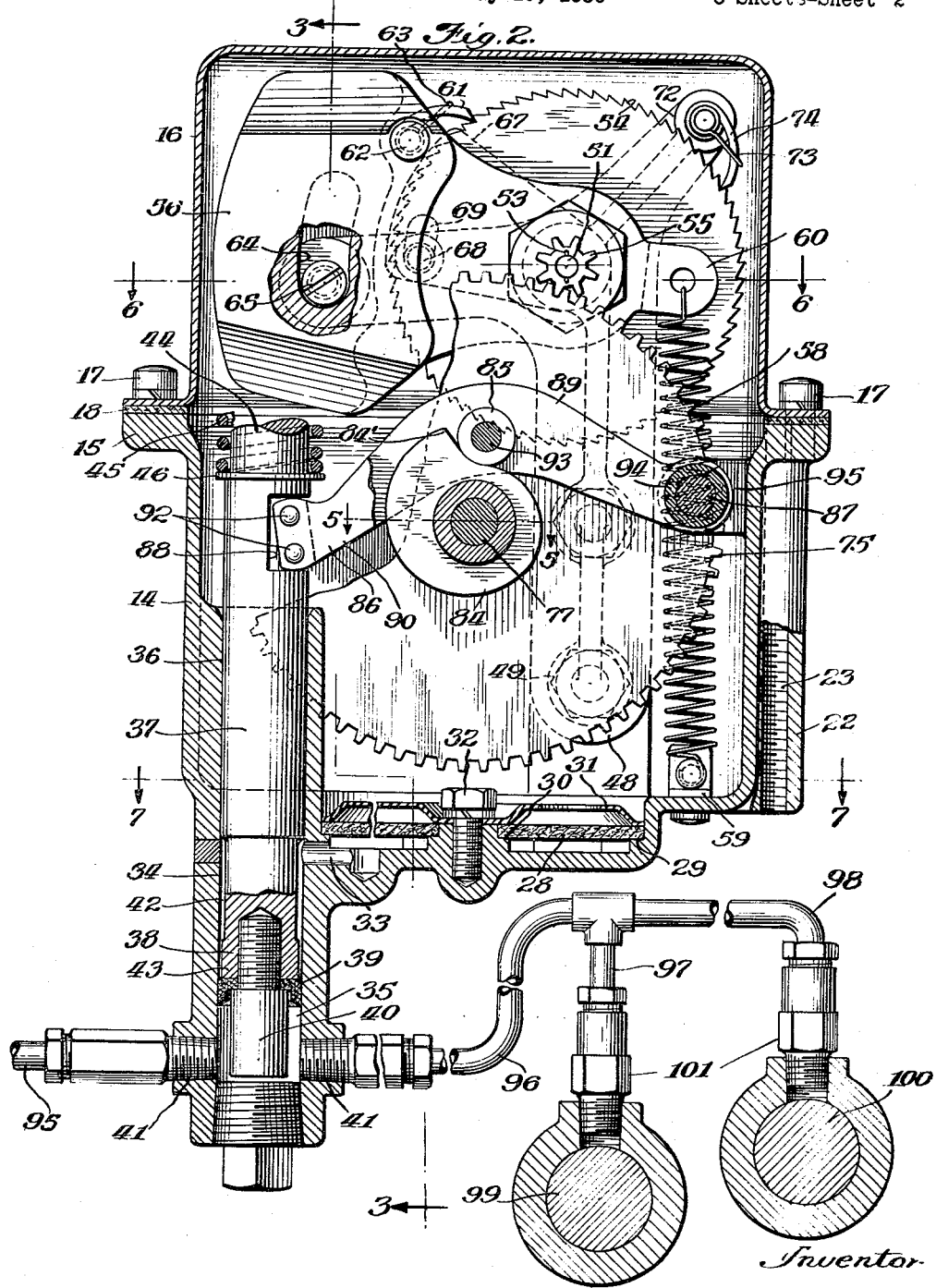
Figure 2 illustrates a complete lubricating system utilizing my combined lubricant reservoir and pump, the latter being shown in section taken on the line 2—2 of Figure 1.
Figure 3:
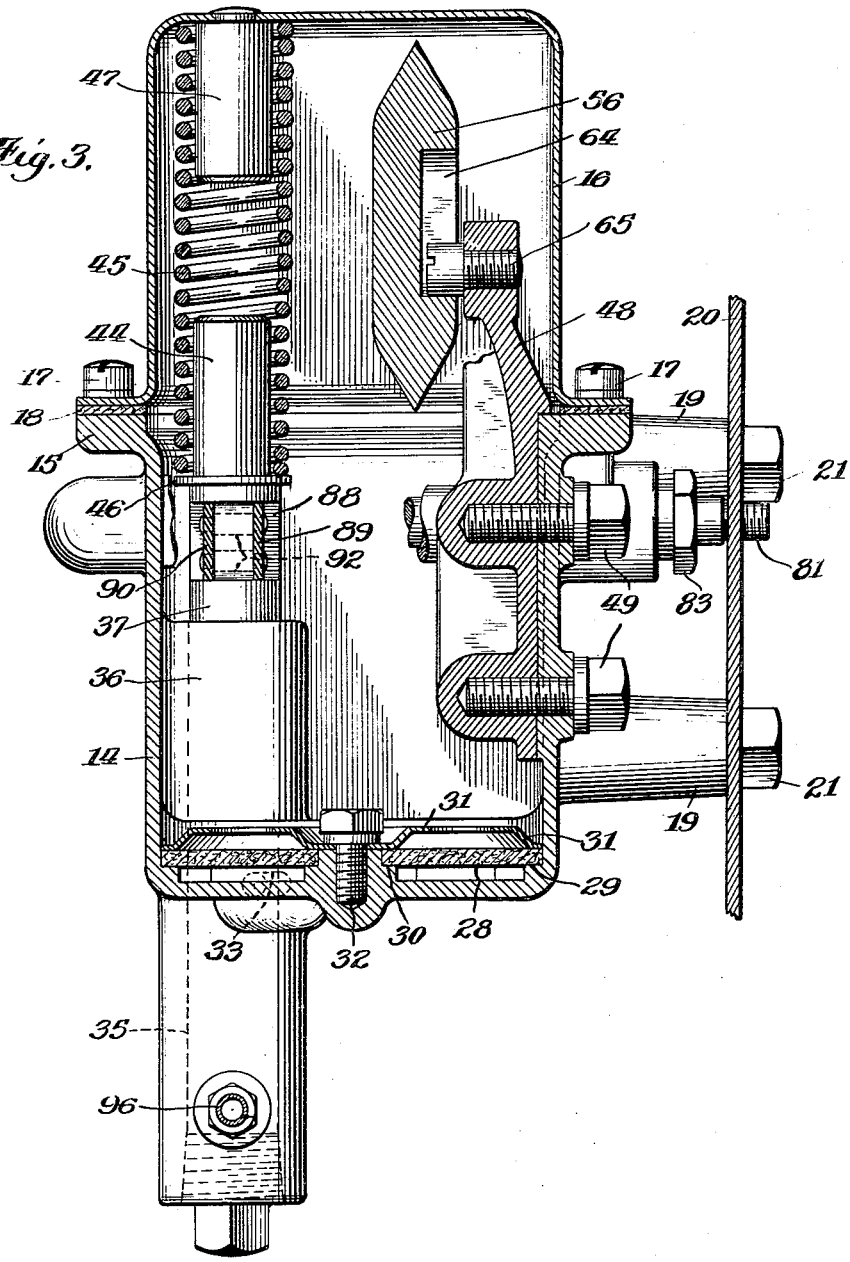
Figure 3 is a section on the line 3—3 of Figure 2, certain parts being omitted in the interest of clearness.
Figure 4:
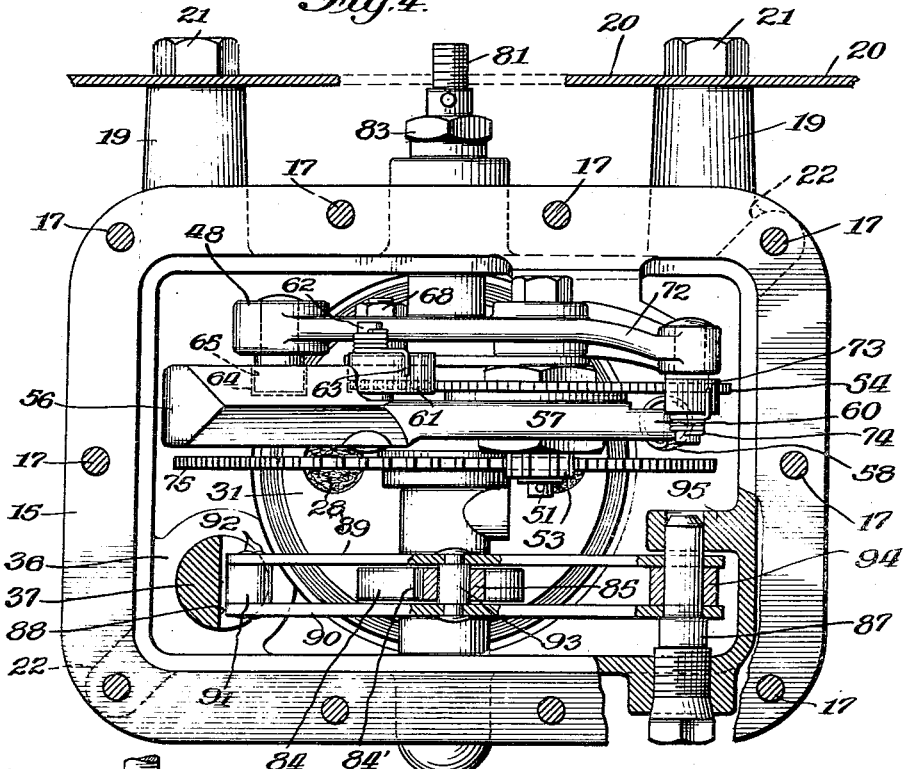
Figure 4 is a top plan view with the cover removed and parts broken away in section.
Figures 5, 6:
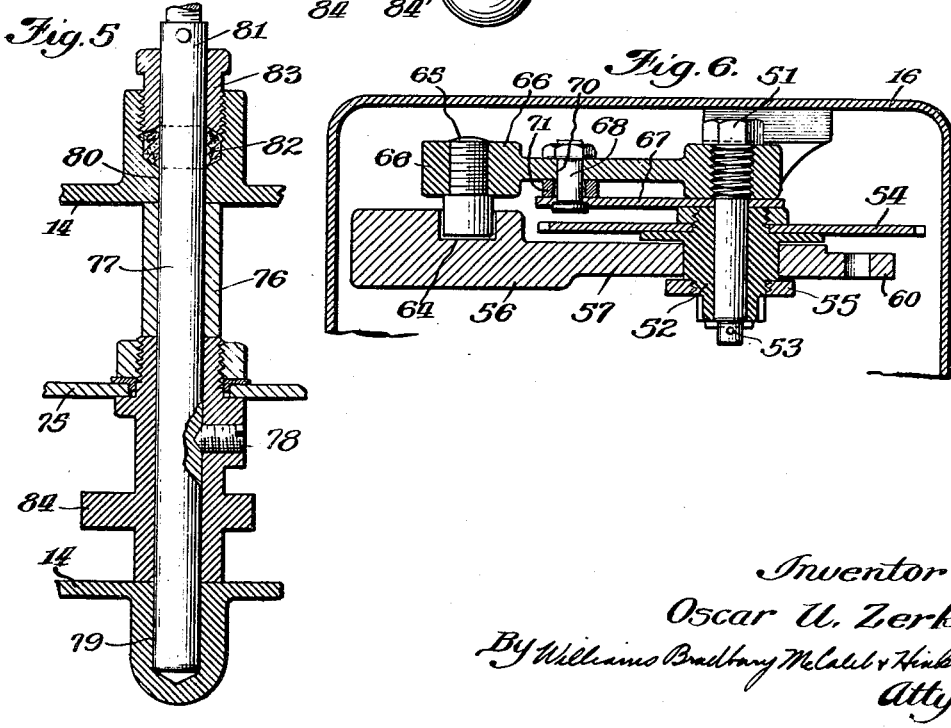
Figure 5 is a partial section on the line 5—5 of Figure 2, with certain parts omitted.
Figure 6 is a partial section on line 6—6 of Figure 2.

As clearly shown in Figure 4, the pawl 61 is of sufficient width to contact with both the ratchet wheel 54 and guard plate 67, and in Figure 2 the guard plate 67 is illustrated as so adjusted that the pawl 61 will only advance the ratchet wheel one tooth for each oscillation of the weight 56 even when this weight oscillates through its entire range. The arm 72 of the Y-shaped frame 48 carries a locking pawl 73 urged into contact with the teeth of the ratchet wheel 54 by a spring 74 and this locking pawl serves to prevent reverse rotation of the ratchet wheel.

The pinion 55 meshes with a gear 75 rigidly mounted on a hub 76 extending from side to side of the casting 14 and fixedly secured to a shaft 77 by a key 78. The shaft 77 is carried in bearings 79 and 80 formed in the casting 14, and the end 81 of the shaft 77 is illustrated as extending entirely through the wall of the casting, a tight joint being provided by packing 82 held in place by a tubular nut 83. As shown most clearly in Figure 4, the end 81 is preferably threaded to receive a crank or other suitable means for operating this shaft independently of the inertia weight, and to facilitate this operation the end 81 is shown as projecting through a suitable opening in the dash 20 so that the pump may be thus operated from the driver's compartment of the vehicle. Such independent operation permits rapid filling of the conduit system when it is first installed and also is desirable for completely refilling the conduit system when it has become partially or completely drained as the result of long periods of idleness for the vehicle.

A cam 84 is formed integral with the hub 76 and coacts with a cam follower 85 carried by the lever 86 pivoted at one end on the pin 87 and having its other end extending into a notch 88 formed in the plunger rod 37. As shown most clearly in Figure 4, the lever 86 comprises two metal strips 89 and 90 clamped in spaced relation at one end by a spacing member 91 and rivets 92. The center portions of the metal strips 89 and 90 are maintained in spaced relation by a suitably shaped rivet 93 which carries the follower 85, and the other ends of the strips 89 and 90 are maintained in spaced relation by the sleeve 94. The pin 87, which passes through the strips 89 and 90 and the sleeve 94, has one end threaded into a wall of the casting 14 and its opposite end supported by an inwardly projecting boss 95 forming an integral part of the wall of the casting 14. The cam 84 is provided with a gradual rise followed by a sudden drop and rotation of this cam serves to gradually raise the lever 86 and plunger rod 37 against the tension of the spring 45 and to thereafter permit the spring 45 to suddenly force the plunger down into the cylinder 35 and force the lubricant therein into the conduit system under suitable pressure.

In Figure 2 I have illustrated my novel pump and reservoir as connected to conduits 95 and 96 leading to the bearings requiring lubrication. For the purpose of illustration the conduit 96 is shown as provided with branches 97 and 98 leading to the bearings 99 and 100, respectively. Metering devices 101 are inserted in the branches of the conduit system to properly distribute the lubricant among the various bearings and these metering devices may be of any well known type. One suitable form of metering device is that shown in my co-pending application, Serial No. 207,609, filed July 22, 1927, now Patent No. 1,797,280. It will be understood, of course, that the particular arrangement of the conduit system will depend upon the needs of the particular automobile or other machine to which my centralized lubricating system is attached.

The operation of my apparatus is as follows: Vibration of the automobile or other machine to which my combined pump and reservoir is attached will result in oscillation of the inertia weight 56 and lever 57 about the sleeve 52. Such oscillation will cause the pawl 61 to engage the teeth of the ratchet wheel 54 and advance this ratchet wheel one tooth for each oscillation of the weight 56. Such advancement of the ratchet wheel 54 results in a similar advancement or rotation of the pinion 55 which meshes with the gear 75 and slowly and intermittently rotates this gear. The cam 84 rotates with the gear 75 and gradually raises the lever 86 and plunger rod 37. The rise of the plunger rod 37 raises the plunger 38 and at the same time compresses the spring 45. As the plunger is raised the lubricant in the annular chamber 42 flows past the collapsed cup leather 39 and into the cylinder 35. When the high point 84' of the cam 84 passes from beneath the follower 85 the spring 45 is released and forces the plunger downwardly in the cylinder 35, expelling the lubricant therefrom and forcing it through the conduits 95 and 96 to the various bearings connected with the conduit system. The lubricant forced into the conduits is properly apportioned among the various bearings by the metering devices 101.

While I have illustrated and described one preferred embodiment of my invention, it is to be understood that numerous changes and modifications may be made therein without departing from the scope of my invention which is limited only by the following claims.

What I claim and desire to secure by United States Letters Patent is:

1. In a centralized lubricating system of the class described, the combination of a container forming a lubricant reservoir, a pump cylinder formed therein, conduits connecting said pump cylinder with bearings requiring lubrication, a plunger reciprocable in said cylinder to discharge lubricant therefrom, a spring for operating said plunger in one direction, a lever for raising said plunger against the tension of said spring, a cam for raising said lever, a large gear rotatable with said cam, a pinion for rotating said gear, a ratchet wheel for driving said pinion, said ratchet wheel and pinion being mounted upon the same sleeve, a weight pivoted about said sleeve, a spring for substantially balancing said weight, a pawl carried by said weight for advancing said ratchet wheel, means for limiting the range of oscillation of said weight, and separate means for limiting the advancement of said ratchet wheel resulting from a single oscillation of said weight.

2. In a centralized lubricating system of the class described, the combination of a container forming a lubricant reservoir, a pump cylinder formed therein, conduits connecting said pump cylinder with bearings requiring lubrication, a plunger reciprocable in said cylinder to discharge lubricant therefrom, a spring for operating said plunger in one direction, a lever for raising said plunger against the tension of said spring, a cam for raising said lever, a large gear rotatable with said cam, a pinion for rotating said gear, a ratchet wheel for driving said pinion, said ratchet wheel and pinion being mounted upon the same sleeve, a weight pivoted about said sleeve, a spring for substantially balancing said weight, a pawl carried by said weight for advancing said ratchet wheel, and adjustable means for controlling the amount of advancement of said ratchet wheel for each oscillation of said weight.

3. In a centralized lubricating system of the class described, the combination of a container forming a lubricant reservoir, a pump cylinder formed therein, conduits connecting said pump cylinder with bearings requiring lubrication, a plunger reciprocable in said cylinder to discharge lubricant therefrom, a spring for operating said plunger in one direction, a lever for raising said plunger against the tension of said spring, a cam for raising said lever, a large gear rotatable with said cam, a pinion for rotating said gear, a ratchet wheel for driving said pinion, said ratchet wheel and pinion being mounted upon the same sleeve, a weight pivoted about said sleeve, a spring for substantially balancing said weight, and a pawl carried by said weight for advancing said ratchet wheel.

4. In lubrication apparatus of the class described a reservoir for lubricant, a pump cylinder communicating therewith and supplied therefrom, a plunger reciprocable in said cylinder, a spring for operating said plunger on its discharge stroke, and inertia operated means for raising said plunger against the tension of said spring, said inertia operated means including a supporting member, a weight pivoted for oscillation about said member, a spring for substantially balancing said weight, means for limiting the range of oscillation of said weight about its pivot, a pawl carried by said weight, a ratchet wheel advanced by said pawl, said ratchet wheel having teeth engaged by said pawl, and an adjustable guard for limiting the number of teeth engaged by said pawl during each oscillation of said weight.

5. In lubricating apparatus of the class described, a lubricant container comprising a base casting, a relatively light sheet metal cover secured to said casting, a pump cylinder formed in said casting and communicating with said container, filter means located adjacent the bottom of said casting and interposed between said container and said cylinder, a plunger reciprocable in said cylinder, a spring for moving said plunger in one direction, and inertia operated mechanism for moving said plunger in the opposite direction, said inertia operated mechanism comprising a pivoted lever engaging said plunger, a cam for oscillating said lever, a ratchet wheel having an axis, a weight pivoted about said axis, a pawl carried by said weight for advancing said ratchet wheel upon oscillation of said weight, a stop member for limiting oscillation of said weight, a second pawl for preventing retrograde movement of said ratchet wheel, a single member secured to said casting and supporting said ratchet wheel, said weight, said stop and said last named pawl, and reduction gearing connecting said ratchet wheel with said cam.

In witness whereof, I hereunto subscribe my name this 14th day of May, 1930.

OSCAR U. ZERK.